United States Patent
Li

(10) Patent No.: US 8,509,235 B2
(45) Date of Patent: Aug. 13, 2013

(54) LAYER-2 PACKET RETURN IN PROXY-ROUTER COMMUNICATION PROTOCOL ENVIRONMENTS

(75) Inventor: Qing Li, Cupertino, CA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 273 days.

(21) Appl. No.: 12/182,287

(22) Filed: Jul. 30, 2008

(65) Prior Publication Data

US 2010/0027544 A1 Feb. 4, 2010

(51) Int. Cl.
*H04L 12/28* (2006.01)
*H04L 12/56* (2006.01)
*H04J 1/16* (2006.01)

(52) U.S. Cl.
USPC .......................... 370/392; 370/235; 370/428

(58) Field of Classification Search
USPC ............................................. 370/392
See application file for complete search history.

(56) References Cited

U.S. PATENT DOCUMENTS

| | | | | |
|---|---|---|---|---|
| 6,683,873 B1 * | 1/2004 | Kwok et al. | ............ | 370/389 |
| 6,853,622 B2 * | 2/2005 | Wils et al. | ............ | 370/246 |
| 7,136,383 B1 * | 11/2006 | Wilson | ............ | 370/392 |
| 7,149,222 B2 * | 12/2006 | Wiryaman et al. | ............ | 370/401 |
| 7,254,611 B1 * | 8/2007 | Clark et al. | ............ | 709/204 |
| 7,349,979 B1 * | 3/2008 | Cieslak et al. | ............ | 709/238 |
| 7,395,348 B1 * | 7/2008 | Cieslak et al. | ............ | 709/238 |
| 7,499,396 B2 * | 3/2009 | Kumazawa et al. | ............ | 370/230 |
| 7,664,688 B2 * | 2/2010 | Clark et al. | ............ | 705/35 |
| 7,725,598 B2 * | 5/2010 | Cieslak et al. | ............ | 709/238 |
| 7,734,816 B2 * | 6/2010 | Cieslak et al. | ............ | 709/244 |
| 7,894,445 B2 * | 2/2011 | Godas et al. | ............ | 370/395.21 |
| 2002/0083175 A1 * | 6/2002 | Afek et al. | ............ | 709/225 |
| 2003/0028671 A1 * | 2/2003 | Mehta et al. | ............ | 709/245 |
| 2003/0187992 A1 * | 10/2003 | Steenfeldt et al. | ............ | 709/227 |
| 2005/0083921 A1 * | 4/2005 | McDermott et al. | ............ | 370/360 |
| 2006/0203828 A1 * | 9/2006 | Kumazawa et al. | ............ | 370/400 |
| 2006/0233155 A1 * | 10/2006 | Srivastava | ............ | 370/351 |
| 2007/0140248 A1 * | 6/2007 | Guo et al. | ............ | 370/392 |
| 2007/0199149 A1 * | 8/2007 | Elkin et al. | ............ | 5/655 |
| 2007/0204048 A1 * | 8/2007 | Zhang | ............ | 709/227 |
| 2008/0222305 A1 * | 9/2008 | Cieslak et al. | ............ | 709/241 |
| 2009/0303894 A1 * | 12/2009 | Keohane et al. | ............ | 370/252 |
| 2011/0026403 A1 * | 2/2011 | Shao et al. | ............ | 370/235 |

* cited by examiner

*Primary Examiner* — Jay P Patel
(74) *Attorney, Agent, or Firm* — Baker Botts L.L.P.

(57) ABSTRACT

A Layer 2 packet return mechanism in a proxy, such as a web cache, operatively associated with a redirecting router. In a particular embodiment, the present invention provides a Layer 2 packet return mechanism in a Web Cache Communication Protocol (WCCP) network environment. In one embodiment, the present invention provides an efficient mechanism allowing a proxy or web cache to recognize WCCP redirected packets, forwarded using Layer 2 forwarding mechanisms, and subsequently to return unprocessed packets to the original forwarding WCCP router using a Layer 2 packet return mechanism.

11 Claims, 4 Drawing Sheets

LAYER-2 PACKET RETURN IN PROXY-ROUTER COMMUNICATION PROTOCOL ENVIRONMENTS

TECHNICAL FIELD

The present disclosure general relates to packet forwarding and return mechanisms between routers and proxies. In a particular implementation, the present disclosure relates to web caching protocols and packet redirection mechanisms within the context of web caching protocols.

BACKGROUND

The Web Cache Communication Protocol (WCCP) specifies interactions between one or more routers and one or more web caches to establish and maintain the transparent redirection of selected types of traffic flowing through a set of routers. The selected traffic is redirected to a group of web caches with the aim of optimizing resource usage and lowering response times. WCCP version 2.0 (v2.0) defines mechanisms to allow one or more routers enabled for transparent redirection to discover, verify, and advertise connectivity to one or more web caches. Having established connectivity the routers and web caches form Service Groups to handle the redirection of network traffic whose characteristics are part of the Service Group definition.

WCCP v2.0 allows a web cache to decline to service a redirected packet and to return it to a router to be forwarded. Packet redirection involves both a packet forwarding mechanism, by which a WCCP-enabled router forwards packets to a web cache, and a packet return mechanism, by which a web cache returns a packet for normal forwarding by the router. Forwarding and return of packets in WCCP can be accomplished using Layer 2 or Layer 3 (Generic Routing Encapsulation (GRE)) packet forwarding mechanisms. WCCP v2.0 allows individual web-caches to negotiate the method by which packets are forwarded to a web-cache from a router, and to negotiate the method by which packets are returned to a router from a web cache. However, by default, GRE is used for packet forwarding and return.

In most network environments, GRE is used for both the packet forwarding and return mechanisms. The use of GRE, however, does present certain challenges and disadvantages. For example, since WCCP operates transparently, web clients and servers typically generate packets having a maximum transmit size and do not account for the possibility that the transmitted packet will be encapsulated with a GRE header when forwarded by, or returned to, a WCCP-enabled router. Consequently, GRE overhead often causes a router to fragment over-sized packets forwarded to a web cache for processing, and to re-assemble returned packets that the web cache decides not to process and return for normal routing. These fragmentation and re-assembly operations may degrade network performance. Indeed, it has been observed that fragmentation and re-assembly processing can consume as much as 100 percent of the CPU cycles on a busy router. Furthermore, GRE encapsulation overhead and fragmentation also results in inefficient utilization of network bandwidth.

Layer 2 forwarding and return mechanisms, when available due to the network topology configuration, obviate the need for fragmentation, as there is no need for GRE encapsulation headers. Despite the advantages of implementing Layer 2 forwarding and return mechanisms, however, known web caches have not implemented Layer 2 packet return mechanisms due to technical challenges that, until the present invention, have yet to be overcome.

SUMMARY

The present invention provides methods, apparatuses and systems directed to implementing a Layer 2 packet return mechanism in a proxy, such as a web cache, operatively associated with a redirecting router. In a particular embodiment, the present invention provides a Layer 2 packet return mechanism in a Web Cache Communication Protocol (WCCP) network environment. In one embodiment, the present invention provides an efficient mechanism allowing a proxy or web cache to recognize WCCP redirected packets, forwarded using Layer 2 forwarding mechanisms, and subsequently to return unprocessed packets to the original forwarding WCCP router using a Layer 2 packet return mechanism. Although the following embodiments are described as operating in connection with web caches and WCCP, the present invention has application to other types of proxies and protocols that utilize Layer 2 header re-writes to implement packet forwarding and return between nodes.

DESCRIPTION OF EXAMPLE EMBODIMENT(S)

A. Overview & Example Network Environment

Figure 1:
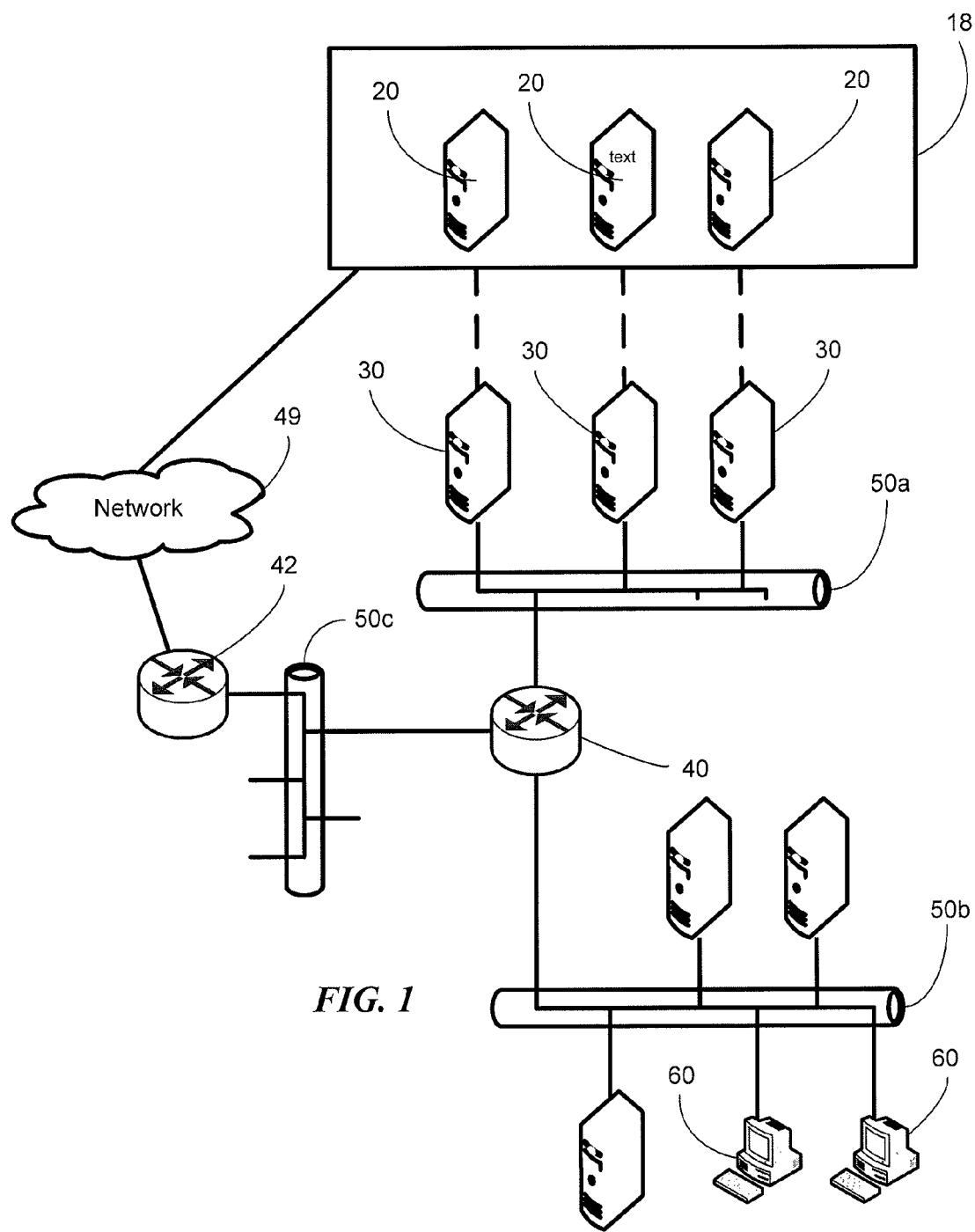
FIG. 1 is a schematic diagram of a computer network environment, in which particular embodiments of the present invention may operate.

FIG. 1 illustrates an example computer network environment, in which particular embodiments of the present invention have application. As FIG. 1 shows, the computer network environment may comprise one or more servers 20, one or more caches 30 and one or more clients 60. Routers 40, 42 and networks 50a, 50b, 50c interconnect server(s) 20, cache(s) 30, client(s) 30 and other hosts operably connected to network 49. Networks 50a, 50b, 50c may comprise Local Area Networks (LANs) implemented by one or more switches, hubs, bridges, wireless access points, and/or other network devices. In one embodiment, networks 50a, 50b, 50c are Ethernet (IEEE 802.3) networks; however, other link layer protocols can be employed.

Servers 20 host one or more network applications, such as a web site or an enterprise business application, accessible to one or more clients 60. Servers 20 may include HTTP server, file server, media server, streaming media server and/or other functional modules to deliver network applications over the computer network environment. Servers 20 may establish HyperText Transport Protocol (HTTP) connections directly with clients 60 and/or with caches 30 acting as proxies for clients 60. Box 18 in connection with the connecting lines from caches 30 and network 49 is intended to represent that one or more of the servers 20 may be accessible over the same broadcast domain as clients 60 and/or caches 30, while other servers 20 may be accessible over a routed network. Clients 60 are computing systems, such as desktop computers, laptop computers and mobile devices, that host client applications that access servers 20 and other hosts operably connected to the computer network environment.

Routers 40, 42 are network devices that route packets according to information at Layer 3 (or Network Layer) of the Open Systems Interconnection (OSI) Reference Model. Router 40 is configured to implement a cache communication protocol, such as the Web Cache Communications Protocol (WCCP) specified by Internet Draft "Web Cache Communication Protocol V2.0," {http://tools.ietf.org/id/draft-wilson-wrec-wccp-v2-01.txt}, which is incorporated by reference herein. In a particular implementation, router 40 is operative to negotiate and configure one or more WCCP Service Groups with one or more caches 30. Each Service Group identifies the attributes defining the packets (e.g., IP addresses, TCP port numbers, etc.) that router 40 should redirect to one of the caches 30 in the Service Group.

Caches 30, in a particular implementation, are network proxies, such as transparent forward proxy caches or gateway (reverse proxy) caches, that operate transparently to clients 60. Caches 30 are operative to cache web documents (e.g., HTML pages, images) and other content in order to reduce bandwidth usage, server load, and perceived response times. A web cache stores copies of documents, media content and other data passing through it. Subsequent requests transmitted by clients 60 may be satisfied from the cache 30 if certain conditions are met. In a particular implementation, caches 30 are operative to terminate TCP connections with clients 60 (emulating a server 20), and establish TCP connections with servers 20 (emulating the clients 60). Caches 30 can apply one or more policies—such as security policies, caching policies and the like—when intermediating connections between servers 20 and clients 60. In a particular embodiment, caches 30 implement WCCP to negotiate and establish one or more Service Groups, above, with router 40. Definition of the Service Groups allows caches 30 to act as proxy caches for one or more servers 20.

As FIG. 1 illustrates, caches 30 and router 40 are in the same broadcast or Layer 2 domain. Accordingly, one or more of caches 30 and router 40 may negotiate to implement Layer 2 packet forwarding and return mechanisms. According to such Layer 2 mechanisms, the Layer 2 headers (e.g., an Ethernet header) of forwarded packets are rewritten to forward/return the packet between a router 40 and a cache 30 (as opposed to GRE, which involves encapsulating packets for redirection in IP layer headers).

Router 40 compares received packets to Service Group definitions and forwards packets meeting a Service Group definition to a cache 30 using a packet forwarding mechanism. Cache 30 uses the packet return mechanism to return packets forwarded to it by router that the cache decides not to process. In Layer 2 forwarding, the Layer 2 (link) layer header of a packet is re-written to identify a link layer address (e.g., Media Access Control (MAC) address) of the router 40 as the source address, and a link layer address of the cache 30 as the destination address.

B. Example Operation

Proxy applications—such as web caches and network security or firewall devices—typically operate at Layer 7 of the OSI Reference Model; however, as part of such functionality, these proxies may also implement lower layer protocols, such as the TCP/IP protocol suite. Cache 30 may also have routing capabilities as well (meaning that it can process packets that are not addressed to it at the IP layer). With Layer 2 forwarding, therefore, it is often difficult to identify at a proxy why a given packet was forwarded (e.g., whether it was received due to normal routing operations or whether the packet was forwarded because it met a Service Group definition).

As discussed in more detail below, cache 30, in one particular embodiment, includes a proxy-router intercommunication module, such as a WCCP module, that is operative to negotiate and establish associations with one or more routers for the redirection of packet traffic. In one implementation, the WCCP module can be extended to operate in connection with a link layer module or driver, which in some embodiments is a kernel module or driver operating in a network protocol stack of the cache 30. When cache 30 negotiates and successfully registers with router 40, cache 30 adds the MAC address of the router 40 to a WCCP router table (accessible to the link layer driver or modules implemented on cache 30). The WCCP module operates at Layer 7 of the OSI Reference Model. In a particular embodiment, the WCCP module hosted by cache 30, responsive to a successful registration with router 40, notifies the networking kernel of cache 30 of the WCCP router 40. The networking kernel discovers the link layer (MAC) address of router 40 and adds it as an entry to a WCCP router table. Discovery of the link layer address can be accomplished using the Address Resolution Protocol (ARP) or other suitable address discovery process. In one embodiment, the WCCP module implemented on cache 30 can be extended to access and update the WCCP router table in response to successful negotiations and terminations of associations between cache 30 and router(s) 40. For example, when a WCCP registration is terminated, the entry for router 40 is deleted from the WCCP router table. A link layer process accesses the WCCP router table to tag received packets having a source link layer address that matches an entry in the table. This tagging operation allows for re-construction of the link layer address for use as a destination link layer address in connection with a Layer 2 packet return mechanism, if the higher layer processes hosted by cache 30 decide to return the packet to router 40 for normal forwarding.

Figure 3:
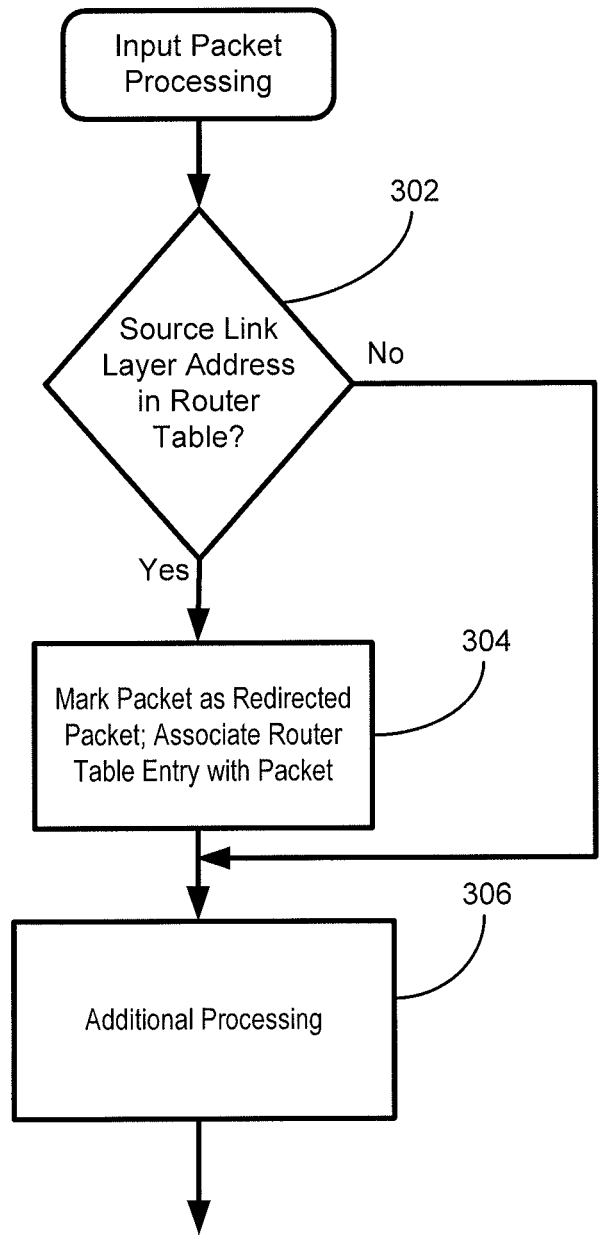
FIG. 3 is a flow chart setting forth an example method directed to processing packets forwarded from a router.

FIG. 3 shows an example method for input packet processing at the link layer according to one possible embodiment of the invention. Packets received at cache 30 are stored in a buffer space. Each packet is stored in connection with state information corresponding to the packet processing. In one embodiment, each packet is stored in the buffer space in association with a wrapper structure that comprises one or more data fields. The data fields can include state information indicating whether the packet was forwarded from a WCCP router, and including a pointer or bit map value that identifies an entry in the WCCP router table associated with the router 40. In one embodiment, the wrapper can include a 1-bit flag or field as a redirected packet indicator, and a multi-bit index field that maps to an entry in the WCCP router table. In other embodiments, the 1-bit flag can be omitted if a convention is used that all non-null values of the index fields are indications of a redirected packet.

Referring now to FIG. 3, after a packet is received, a link layer process accesses the source address (e.g., MAC address) of the link layer header of the received packet and looks up the source address against the WCCP router table. If the source address is not found in the WCCP router table (302), the link layer process may perform additional link layer processing (306) and forward the packet to higher layer processes in a network protocol stack (e.g., network (IP) and transport (e.g., Transport Control Protocol (TCP) and User Datagram Protocol (UDP) layers). Otherwise, if the source address in the link layer header is found in the WCCP router table (302), the link layer process marks the packet as a WCCP router-redirected packet and associates the link layer address of the WCCP router with the packet (304). In a particular embodiment, the link layer process may set a flag in the wrapper structure in the buffer space storing the packet to indicate that the packet is a router-redirected packet. Additionally, the link layer process may set a pointer or set an index value that identifies the entry in the WCCP router table that matches the source address of the link layer header.

As a packet is processed, information in the originally received packet maintained in the buffer space may be deleted or overwritten. Accordingly, when a packet is to be returned using L2 packet return, the MAC layer information identifying the forwarding router 40 may be lost. Because these flags and index values are set in the wrapper structure associated with the packet, however, they persist while the packet is processed by higher layer processes and can subsequently be used to re-construct the link layer address of the WCCP router that forwarded the packet, if packet return is required.

Figure 4:
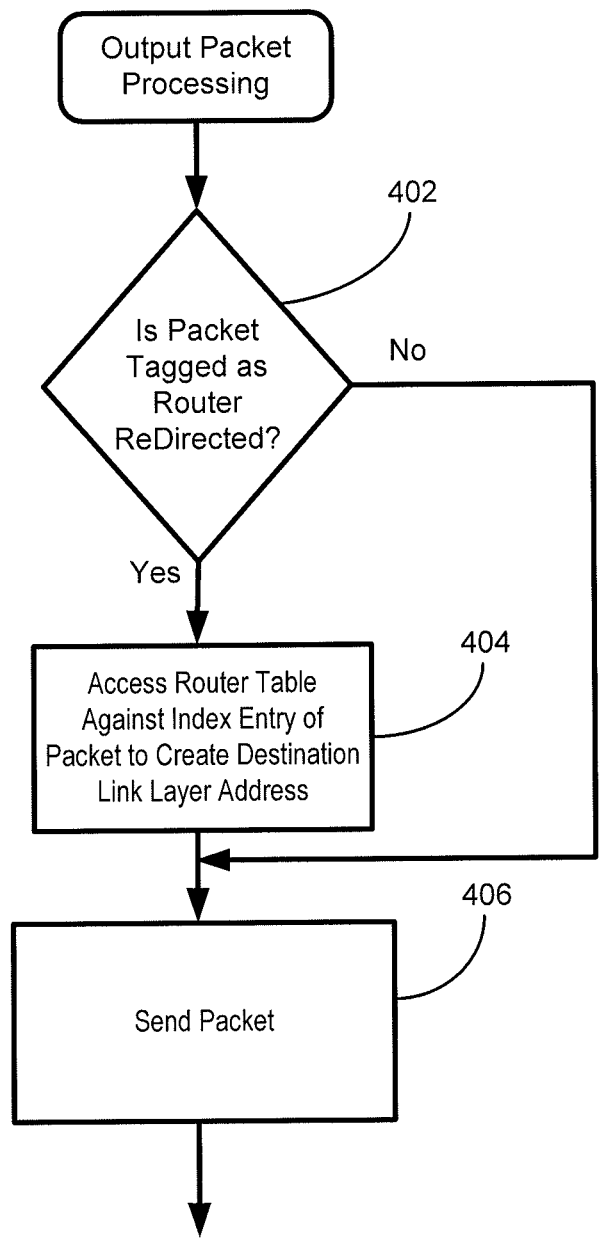
FIG. 4 is a flow chart showing an example method directed to processing packets to be returned to a router for normal forwarding.

FIG. 4 sets forth an example method for output packet processing at the link layer according to one possible embodiment of the invention. As discussed above, the caching (or other higher layer) modules of cache 30 may decide that one or more WCCP redirected packets should be returned to router 40 for normal forwarding. As FIG. 4 illustrates, when processing of the packet for output is passed to a link layer module for processing, the link layer module generates the destination link layer address by accessing the WCCP router table.

In a particular embodiment, the link layer process accesses the wrapper structure associated with the packet and examines the flag to determine whether it has been set (indicating that it is a WCCP-router-redirected packet) (402). If so, the link layer process recreates the link layer address for the destination field of the link layer header of the packet to be transmitted (404). In a particular implementation, the link layer process accesses the WCCP router table against the index value identified in the wrapper structure associated with the packet to identify the link layer address of the router that originally forwarded the packet. The link layer process uses the link layer address as the destination link layer address and sends the packet to the WCCP router (406). Otherwise, if the packet is not flagged as being a router-redirected packet, it is sent using normal link layer transmit processes (406).

C. Example Computing System Architectures

While the foregoing processes and mechanisms can be implemented by a wide variety of physical systems and in a wide variety of network environments, the proxy and cache systems described below provide example computing system architectures for didactic, rather than limiting, purposes.

Figure 2:
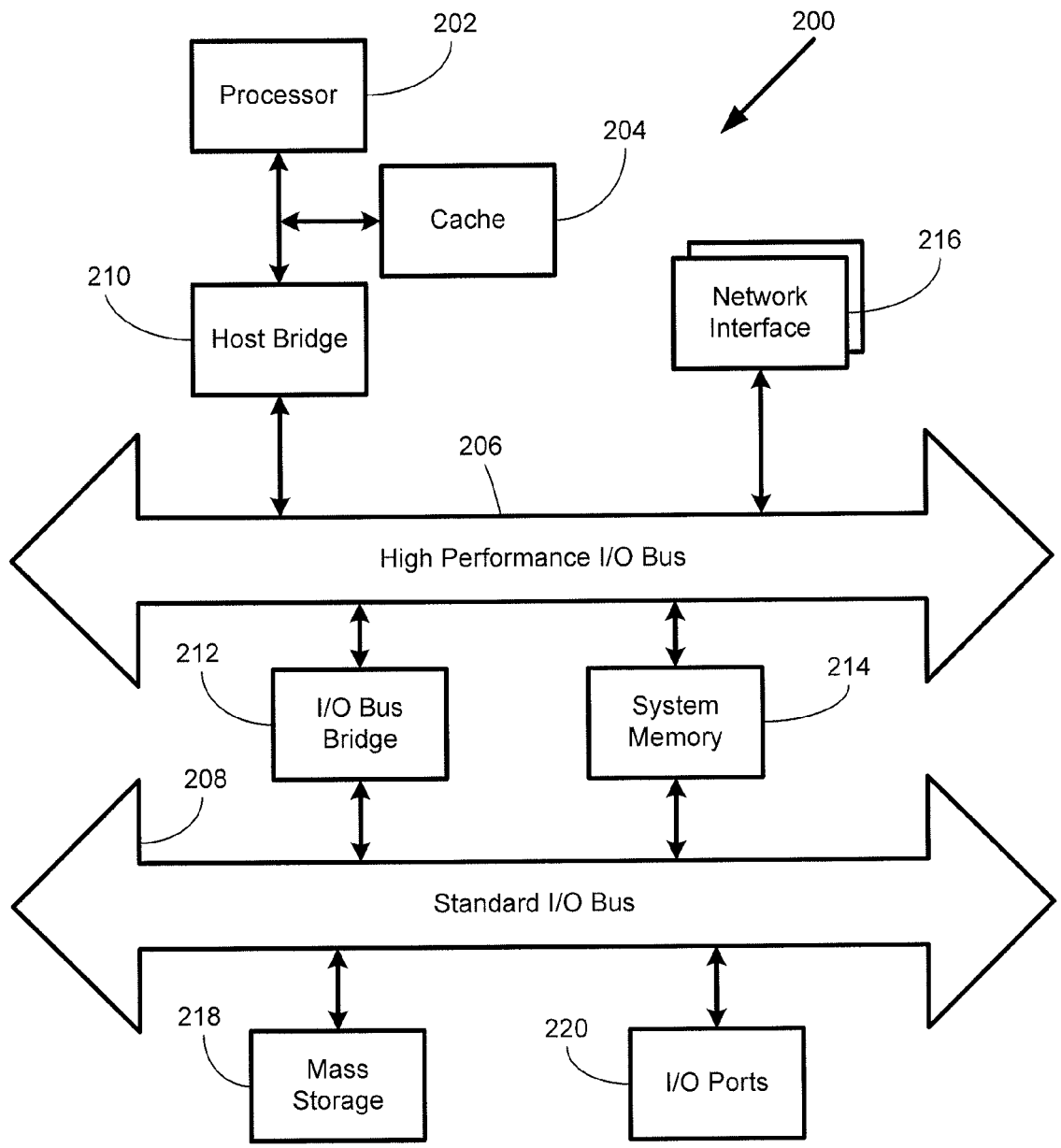
FIG. 2 is a functional block diagram illustrating an example network device hardware system architecture.

FIG. 2 illustrates an example computing system architecture, which may be used to implement a physical proxy or cache server. In one embodiment, hardware system 200 comprises a processor 202, a cache memory 204, and one or more executable modules and drivers, stored on a computer readable medium, directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and one or more network/communication interfaces 216 couple to bus 206. Hardware system 200 may further include video memory (not shown) and a display device coupled to the video memory. Mass storage 218, and I/O ports 220 couple to bus 208. Hardware system 200 may optionally include a keyboard and pointing device, and a display device (not shown) coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interface 216 provides communication between hardware system 200 and any of a wide range of networks, such as an Ethernet (e.g., IEEE 802.3) network, etc. Mass storage 218 provides permanent storage for the data and programming instructions to perform the above-described functions implemented in the cache or proxy 30, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments, only a single bus may exist, with the components of hardware system 200 being coupled to the single bus. Furthermore, hardware system 200 may include additional components, such as additional processors, storage devices, or memories.

As discussed below, in one implementation, the operations of one or more of the proxy or cache servers described herein are implemented as a series of executable modules run by hardware system 200. In a particular embodiment, a set of software modules or drivers implements a network communications protocol stack, including a link layer driver, a network layer driver, one or more transport layer modules (e.g., TCP, UDP, etc.), session layer modules, application layer modules and the like. The hardware system 200 may also host a proxy-router intercommunication module, such as a WCCP module, that negotiates associations with one or more routers for redirection of network traffic. The foregoing functional modules may be realized by hardware, executable modules stored on a computer readable medium, or a combination of both. For example, the functional modules may comprise a plurality or series of instructions to be executed by a processor in a hardware system, such as processor 202. Initially, the series of instructions may be stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interface 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. Any suitable operating system may be used, such as the Windows Operating System offered by Microsoft Corporation, the Apple Macintosh Operating System, available from Apple Computer Inc. of Cupertino, Calif., UNIX operating systems, LINUX operating systems, BSD operating systems, and the like. Of course, other implementations are possible. For example, the proxy and caching functionalities described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with WCCP, the present invention can be used in connection with any suitable protocol environment. Furthermore, implementations of the invention can be used in systems directed to other types of proxies, such as protocol or network traffic accelerators, firewalls and packet inspection devices. Other embodiments will be evident to those of ordinary skill in the art. It is therefore not intended that the present invention be limited, except as indicated by the appended claims.

What is claimed is:

1. A method comprising:
   maintaining a data structure comprising one or more entries, each entry comprising a link layer address of a redirecting router corresponding to an established proxy-router association of one or more established proxy-router associations for redirection of packets;
   associating, at a link layer process, redirected packets received as arriving from redirecting routers identified in the data structure, wherein the redirected packets each comprise a link layer header including a source link layer address, and wherein associating redirected packets, for one or more redirected packets, comprises:
      accessing, at the link layer process, the data structure using the source link layer address of a packet to identify a matching entry in the data structure; and
      if the data structure includes a matching entry, marking the packet as a router-redirected packet and associating the packet with the matching entry; and
   using, at a link layer process, the association to determine the link layer address information in the data structure to construct link layer headers for returning the redirected packets to the redirecting router by:
      receiving, at the link layer process, a redirected packet returned from a higher layer process;
      accessing the data structure to identify an entry associated with the packet; and
      constructing a destination link layer address for the packet based on address information of the entry of the data structure associated with the packet.

2. The method of claim 1 further comprising
   establishing a proxy-router association with a redirecting router for redirection of packets; and
   adding, responsive to establishing the router-proxy association, link layer address information of the re-redirecting router to the data structure.

3. The method of claim 1 further comprising
   deleting, response to termination of a router-proxy association with a redirecting router, a corresponding entry in the data structure.

4. The method of claim 1 wherein the link layer address information comprises a Media Access Control (MAC) address.

5. The method of claim 1 wherein the router-proxy association is a Service Group defined by a Web Caching Communication Protocol.

6. An apparatus, comprising:
   one or more network interfaces,
   a memory;
   one or more processors;
   a proxy-router intercommunication module comprising computer-executable instructions stored on a computer readable medium, the instructions readable by the one or more processors, the instructions, when read and executed, for causing the one or more processors to:
      establish proxy-router associations with one or more redirecting routers for redirection of packets;
      cause, responsive to a successful association with a redirecting router, an entry for the redirecting router to be added to a redirecting router table;
   a network communications protocol stack comprising a link layer module comprising computer-executable instructions stored on a computer readable medium, the instructions readable by the one or more processors, the instructions, when read and executed, for causing the one or more processors to:
      access a source link layer address of a received packet stored in the memory;
      associate, responsive to finding an entry in the redirecting router table that matches the source link layer address, the received packet with the found entry;
      receive the redirected packet returned from a higher layer process;
      access the redirecting router table to identify an entry associated with the redirected packet; and
      construct a destination link layer address for the packet based on address information of the entry of the forwarding router table associated with the packet.

7. The apparatus of claim 6 further comprising computer-executable instructions for causing the one or more processors to
   tag, responsive to finding an entry in the redirecting router table that matches the source link layer address, the received packet as a redirected packet.

8. The apparatus of claim 6 further comprising computer-executable instructions for causing the one or more processors to
   cause, responsive to a termination of the association with the redirecting router, the entry for the redirecting router to be deleted from the redirecting router table.

9. The apparatus of claim 6 wherein the source link layer address of the received packet comprises a Media Access Control (MAC) address.

10. The apparatus of claim 6 wherein the router-proxy associations are Service Groups defined by a Web Caching Communication Protocol.

11. The apparatus of claim 6 wherein the proxy-router intercommunication module further comprises computer-executable instructions, when read and executed, for causing the one or more processors to:

cause, responsive to termination of an association with a redirecting router, an entry for the redirecting router to be deleted from the redirecting router table.

\* \* \* \* \*